(12) United States Patent
Salter et al.

(10) Patent No.: US 9,863,171 B1
(45) Date of Patent: Jan. 9, 2018

(54) VEHICLE COMPARTMENT

(71) Applicant: Ford Global Technologies, LLC, Dearborn, MI (US)

(72) Inventors: Stuart C. Salter, White Lake, MI (US); Pietro Buttolo, Dearborn Heights, MI (US); Christopher Anthony Danowski, Rochester, MI (US); Paul Kenneth Dellock, Northville, MI (US); James Stewart Rankin, II, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/278,437

(22) Filed: Sep. 28, 2016

(51) Int. Cl.
| | |
|---|---|
| *B60R 7/04* | (2006.01) |
| *E05B 17/10* | (2006.01) |
| *E05B 81/64* | (2014.01) |
| *E05B 83/32* | (2014.01) |

(52) U.S. Cl.
CPC ............... *E05B 83/32* (2013.01); *B60R 7/04* (2013.01); *E05B 17/10* (2013.01); *E05B 81/64* (2013.01)

(58) Field of Classification Search
CPC ............... B60J 7/04; B60R 2011/0096; B60R 2011/0098; B60R 2011/0007; B60R 7/04; E05B 17/10; E05B 81/64; E05B 83/32
USPC .............................................. 296/24.34, 37.8
See application file for complete search history.

(56) References Cited

U.S. PATENT DOCUMENTS

| | | | |
|---|---|---|---|
| 2,486,859 A | 11/1949 | Meijer et al. | |
| 5,053,930 A | 10/1991 | Benavides | |
| 5,709,453 A | 1/1998 | Krent et al. | |
| 5,839,718 A | 11/1998 | Hase et al. | |
| 6,031,511 A | 2/2000 | DeLuca et al. | |
| 6,117,362 A | 9/2000 | Yen et al. | |
| 6,260,988 B1 | 7/2001 | Misawa et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Gregory A Blankenship
(74) *Attorney, Agent, or Firm* — Vichit Chea; Price Heneveld LLP (57) ABSTRACT

A compartment for a vehicle is provided herein. The compartment includes a housing defining an interior volume. A lid is pivotably coupled to the housing and is configured to move between a closed position in which the interior volume is inaccessible and an open position in which the interior volume is accessible. A latch is configured to maintain the lid in a locked and an unlocked state when the lid is disposed in the closed position. A compartment sensing system is operably coupled with the latch. The latch is placed in the locked state when the sensing system detects the presence of an item within the interior volume.

19 Claims, 8 Drawing Sheets

(56) References Cited

U.S. PATENT DOCUMENTS

| | | | |
|---|---|---|---|
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,354,182 B2 | 4/2008 | Bartels |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,878,035 B2 | 2/2011 | Yamaguchi et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,103,414 B2 | 1/2012 | Boss et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,237,542 B2 | 8/2012 | Katagiri |
| 8,247,761 B1 | 8/2012 | Agrawal et al. |
| 8,276,963 B2 * | 10/2012 | Ishikawa | B60R 7/04 296/24.34 |
| 8,286,378 B2 | 10/2012 | Martin et al. |
| 8,408,765 B2 | 4/2013 | Kuhlman et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,870,144 B2 * | 10/2014 | Zavattieri | B60N 3/105 248/311.2 |
| 8,876,352 B2 | 11/2014 | Robbins et al. |
| 8,937,454 B2 | 1/2015 | Baarman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,115,515 B1 * | 8/2015 | South | E05B 77/54 |
| 9,187,034 B2 | 11/2015 | Tarahomi et al. |
| 9,194,168 B1 | 11/2015 | Lu et al. |
| 9,299,887 B2 | 3/2016 | Lowenthal et al. |
| 9,442,888 B2 | 9/2016 | Stanfield et al. |
| 9,637,078 B2 * | 5/2017 | Bull | B60R 21/0132 |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2006/0087826 A1 | 4/2006 | Anderson, Jr. |
| 2006/0097121 A1 | 5/2006 | Fugate |
| 2006/0112746 A1 | 6/2006 | Thompson |
| 2007/0030136 A1 | 2/2007 | Teshima et al. |
| 2007/0032319 A1 | 2/2007 | Tufte |
| 2007/0246495 A1 | 10/2007 | Hague |
| 2007/0285938 A1 | 12/2007 | Palmer et al. |
| 2007/0297045 A1 | 12/2007 | Sakai et al. |
| 2009/0096240 A1 * | 4/2009 | Hanzel | B60N 3/08 296/37.8 |
| 2009/0217970 A1 | 9/2009 | Zimmerman et al. |
| 2009/0219730 A1 | 9/2009 | Syfert et al. |
| 2009/0224564 A1 * | 9/2009 | O'Brien | B60N 2/4686 296/37.8 |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0066113 A1 * | 3/2010 | Browne | B60N 2/4646 296/24.34 |
| 2010/0102736 A1 | 4/2010 | Hessling |
| 2011/0012062 A1 | 1/2011 | Agrawal et al. |
| 2011/0169291 A1 * | 7/2011 | Siethorst | B60R 7/06 296/37.8 |
| 2012/0001406 A1 | 1/2012 | Paxton et al. |
| 2012/0020101 A1 | 1/2012 | Pastrick et al. |
| 2012/0104954 A1 | 5/2012 | Huang |
| 2012/0109419 A1 | 5/2012 | Mercado |
| 2012/0183677 A1 | 7/2012 | Agrawal et al. |
| 2012/0280528 A1 | 11/2012 | Dellock et al. |
| 2013/0009855 A1 | 1/2013 | Gaily et al. |
| 2013/0092965 A1 | 4/2013 | Kijima et al. |
| 2013/0154821 A1 | 6/2013 | Miller et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0042766 A1 | 2/2014 | Meyer |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0022313 A1 * | 1/2015 | Maier | G05B 1/01 340/5.1 |
| 2015/0035308 A1 * | 2/2015 | Huebner | B60R 7/04 296/37.8 |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0324708 A1 | 11/2015 | Skipp et al. |
| 2015/0339928 A1 | 11/2015 | Ramanujam |
| 2015/0346727 A1 | 12/2015 | Ramanujam |
| 2015/0366036 A1 | 12/2015 | Luostarinen |
| 2016/0016506 A1 | 1/2016 | Collins et al. |
| 2016/0082880 A1 | 3/2016 | Co et al. |
| 2016/0102819 A1 | 4/2016 | Misawa et al. |
| 2016/0236613 A1 | 8/2016 | Trier |
| 2016/0344221 A1 * | 11/2016 | Kramer | H02J 7/025 |
| 2017/0158125 A1 | 6/2017 | Schuett et al. |

FOREIGN PATENT DOCUMENTS

| | | |
|---|---|---|
| CN | 201193011 Y | 2/2009 |
| CN | 202357840 U | 8/2012 |
| CN | 204127823 U | 1/2015 |
| CN | 104869728 A | 8/2015 |
| CN | 105303642 A | 2/2016 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2719580 A1 | 4/2014 |

(56) References Cited

FOREIGN PATENT DOCUMENTS

| | | | |
|---|---|---|---|
| EP | 2778209 | A1 | 9/2014 |
| JP | 2000052859 | A | 2/2000 |
| JP | 2000159011 | A | 6/2000 |
| JP | 2007238063 | A | 9/2007 |
| KR | 20060026531 | A | 3/2006 |
| WO | 2006047306 | A1 | 5/2006 |
| WO | 2008093266 | A1 | 8/2008 |
| WO | 2014068440 | A1 | 5/2014 |
| WO | 2014161927 | A1 | 10/2014 |

* cited by examiner

VEHICLE COMPARTMENT

FIELD OF THE INVENTION

The present invention generally relates to a vehicle storage compartment, and more particularly, to a lockable compartment for a vehicle.

BACKGROUND OF THE INVENTION

Storage compartments within a vehicle may be configured to hold a wide range of items. The ability to lock valuable items within the compartment may provide a unique vehicle feature.

SUMMARY OF THE INVENTION

According to one aspect of the present disclosure, a vehicle is disclosed. The compartment includes a housing defining an interior volume. A lid is pivotably coupled to the housing and is configured to move between a closed position in which the interior volume is inaccessible and an open position in which the interior volume is accessible. A latch is configured to maintain the lid in a locked and an unlocked state when the lid is disposed in the closed position. A compartment sensing system is operably coupled with the latch. The latch is placed in the locked state when the sensing system detects the presence of an item within the interior volume.

According to another aspect of the present disclosure, a compartment for a vehicle is disclosed. The compartment includes a housing defining an interior volume. A lid is pivotably coupled to the housing. A latch is configured to maintain the lid in a locked and an unlocked state. A controller is operably coupled with the latch. A compartment sensing system is operably coupled with the controller and includes a wireless transceiver. The latch is placed in the locked state when the wireless transceiver detects a presence of an electronic device.

According to yet another aspect of the present disclosure, a compartment for a vehicle is disclosed. The compartment includes a housing defining an interior volume. A lid is pivotably coupled to the housing. a latch is configured to maintain the lid in a locked and an unlocked state. A latch interface is operably coupled with the latch. A compartment sensing system is operably coupled with the latch. The latch is actuated based the presence of an item within the interior volume and a vehicle condition.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
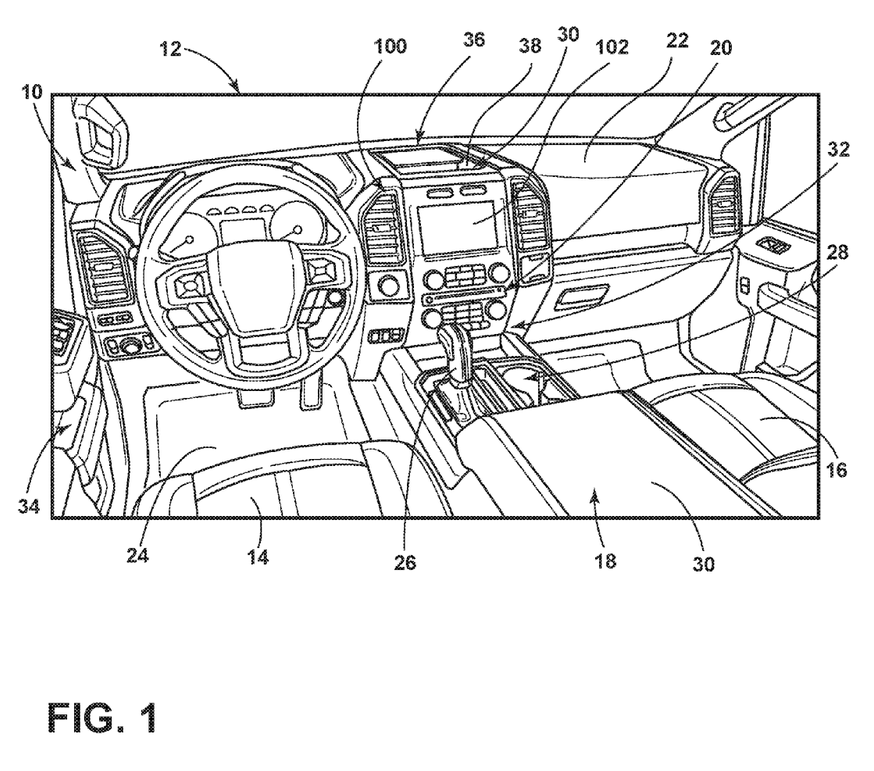
FIG. 1 is a perspective view of a vehicle interior having one or more enclosable compartments therein, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an enclosable compartment for a vehicle. In some embodiments, the enclosable compartment includes a sensing system for detecting the presence of an item stored within the compartment. Additionally, or alternatively, the enclosable compartment may include an electronic latch that is configured to maintain a locked state when the vehicle is unoccupied with items is stored within the compartment.

As shown in FIG. 1, an interior 10 of a vehicle 12, according to one embodiment, includes a driver seat 14 laterally spaced from a front passenger seat 16 on opposing sides of the vehicle 12. As generally understood in the art, a center console 18 is arranged longitudinally between the driver seat 14 and the front passenger seat 16 and extends rearward from a center stack 20 of a vehicle instrument panel 22. In the illustrated embodiment, the center console 18 is supported by a floor 24 of the vehicle 12 and is situated forward from any rear passenger seats in the vehicle 12. As illustrated, the center console 18 also includes a shifter 26 and a pair of cup holders 28 positioned forward from an enclosable compartment 30, although it is contemplated that these features may be alternatively positioned on the center console 18 or may otherwise not be included on the center console 18. It is also contemplated that a front section 32 of the center console 18 may not connect with the center stack 20 and that the compartment 30 may be alternatively positioned within the other portions of the vehicle 12, such as within a door panel 34, a folded seatback of a center seat, a rear-row of seating, a mid-row of seating, or other areas that may be arranged to include an enclosable storage compartment 30.

An additional, or alternative, enclosable compartment 30 may be disposed within a generally central position 36 of the instrument panel 22. The enclosable compartment 30 may be disposed in any other location of within the vehicle 12 without departing from the scope of the present disclosure.

Figure 2:
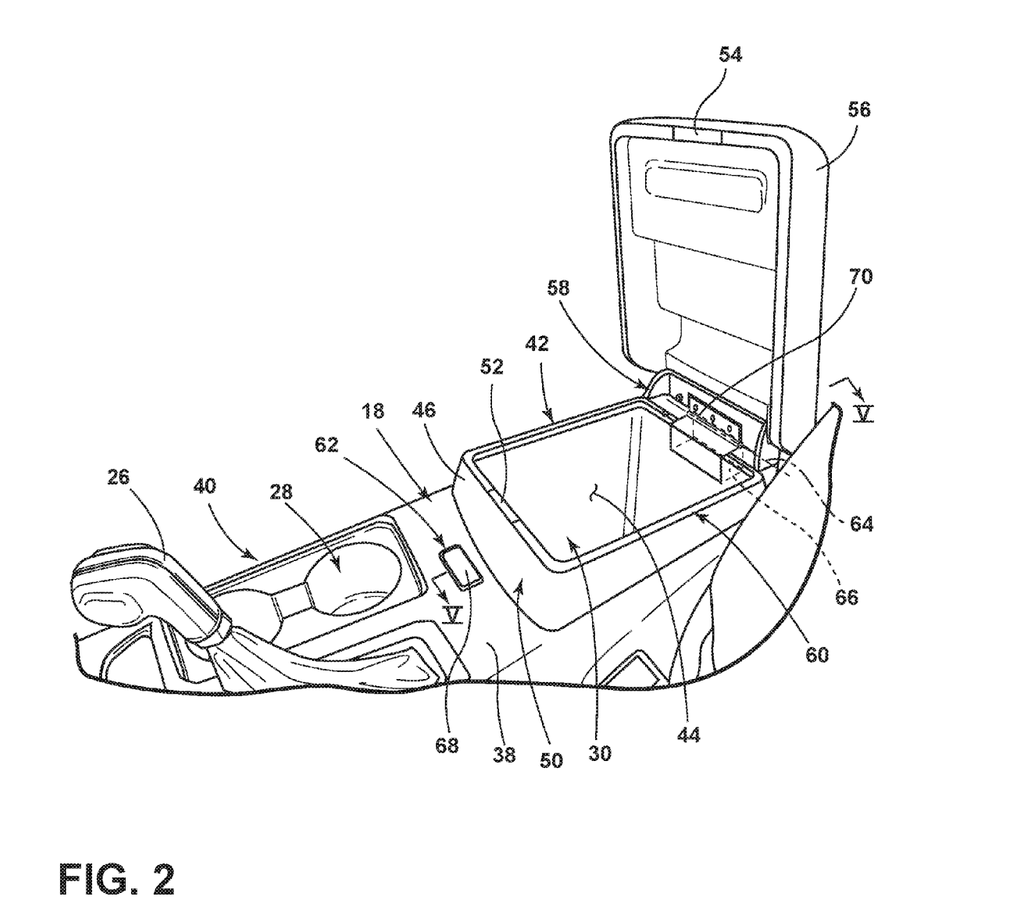
FIG. 2 is a top perspective view of a center console of the vehicle having a lid in an open position to expose the interior volume of the compartment, according to one embodiment.

Referring to FIG. 2, the center console 18 includes a housing 38 containing the cup holders 28 proximate a center section 40 of the housing 38. A rear section 42 of the housing 38 defines an interior volume 44 of the compartment 30. The interior volume 44 of the compartment 30 extends down from an exterior surface 46 of the housing 38 and terminates at a floor 48 (FIG. 5) of the compartment 30.

A forward portion 50 of the compartment 30 has a latch 52 for retaining a corresponding latch engagement portion 54 on a lid 56. The lid 56 has a consistent surface sized to span over the interior volume 44 and enclose the compartment 30. The lid 56 is pivotally coupled with a rear portion 58 of the compartment 30 and is pivotal between a closed position (FIG. 1) that substantially encloses an upper opening 60 of the compartment 30 and an open position (FIG. 2) for providing access to the interior volume 44 of the compartment 30.

In the illustrated embodiment, the lid 56 pivots about a lateral axis 64 defined by a torsional actuator module 66 that is disposed proximately to the rear portion 58 of the compartment 30. The actuator module 66 may include any electrically (or mechanically) driven component 70 such as motors, solenoids, and the like, to provide autonomous manipulation of the lid 56. In alternate embodiments, a hinge may be utilized for pivoting the lid 56 through one or more positions. It is also contemplated that the pivotal axis may be employed in an alternative location or arrangement, such as a gooseneck hinge or other conceivable pivotal arrangements generally understood by one having ordinary skill in the art. Further, it is understood that the compartment 30 may be enclosable by an alternative means including a slidable lid, multiple lid enclosures, or a type of a detachable lid.

A latch interface 62 is positioned within the vehicle 12, and in some embodiments, is disposed proximate the compartment 30 and/or on the housing 38 of the center console 18. The latch interface 62 is configured to allow an occupant of the vehicle 12 to actuate the latch 52 between locked and unlocked states. When unlocked, the lid 56 may rotate between the closed position and the open position. The latch interface 62 may include a physical actuated button, as is known in the art. Alternatively, the latch interface 62 may be configured as an electrical switch 68 that is electrically coupled with the latch 52.

It should be noted that the term "open" as it relates to an "open storage compartment" indicates that the compartment 30 is not completely enclosed. For example, an open compartment 30 does not have a hinged lid 56 that completely encloses an interior volume 44 within the compartment 30 when the lid 56 is closed. As another example, an open compartment 30 may include side walls and a bottom portion; however, in such a configuration, the open compartment 30 may not include a top portion that completely encloses the interior volume 44. It should be noted that if the top portion partially covers the interior volume 44, then the compartment 30 is considered an "open" compartment 30 because it is not completely enclosed.

Figure 3:
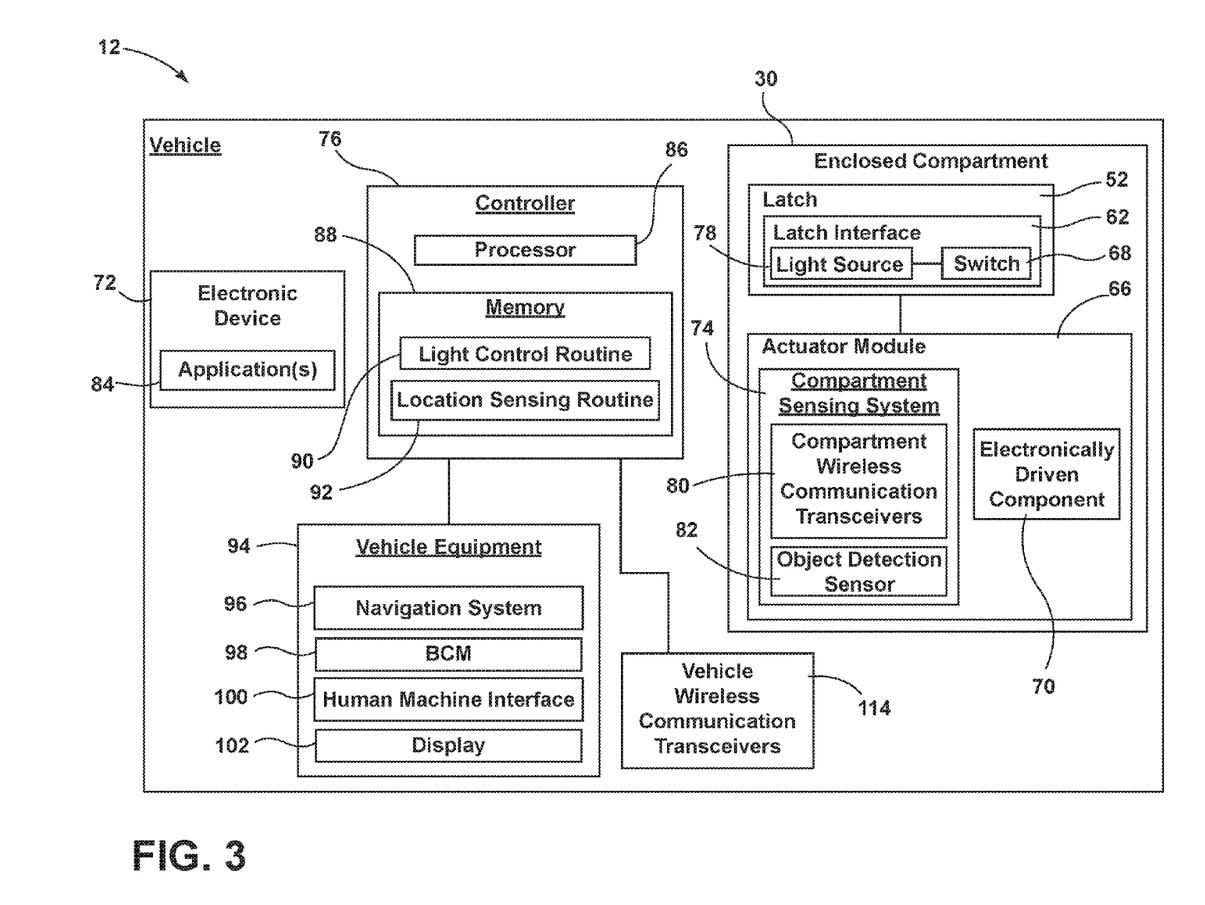
FIG. 3 is a block diagram of a lighting system of a vehicle.

Referring to FIG. 3, the enclosable compartment 30 disposed within the vehicle 12 is shown, according to one embodiment. The enclosable compartment 30 includes the latch 52 and the latch interface 62 that is operably coupled with the latch 52. According to one embodiment, the latch interface 62 is an electronic latch interface 62 that may communicate with a portable electronic device carried by a vehicle occupant. The compartment 30 also includes a sensing system 74 for detecting the presence of the electronic device 72 and a controller 76 in communication with the sensing system 74 and configured to selectively operate the latch 52 based on the presence of an item and/or the electronic device 72 within the compartment 30 and information indicative of an impending departure of the vehicle occupant from the vehicle 12.

In the depicted embodiment, the latch interface 62 may include one or more light sources 78 that illuminate the latch interface 62 and/or indicate a current state of the latch 52. The light source 78 may include any form of light source. For example fluorescent lighting, light emitting diodes (LEDs), organic LEDs (OLEDs), polymer LEDs (PLEDs), solid state lighting, or any other form of lighting configured to emit light may be utilized.

The sensing system 74 may include a compartment wireless communication transceiver 80 disposed in and/or in close proximity to the enclosable compartment 30. In operation, the compartment wireless communication transceiver 80 is configured to interact with the electronic device 72 in order to detect its presence within the enclosable compartment 30 and/or any other location of the electronic device 72 around the vehicle 12. In one example, the compartment wireless communication transceiver 80 may be configured to communicate with the electronic device 72 using Bluetooth™ low energy signals. In alternative embodiments, the sensing system 74 may utilize other forms of wireless communication between the wireless communication transceiver 80 and the electronic device 72 such as, but not limited to, Wi-Fi™. The wireless communication transceiver 80 is configured to transmit and receive wireless signals (e.g., Bluetooth™ low energy signals) to and from the electronic device 72. The compartment wireless communication transceiver 80 may be aware of its location within the vehicle 12 and is capable of sharing its location with the electronic device 72. Additionally, the wireless communication transceiver 80 may communicate with the controller 76.

The sensing system 74 may further include an object detection sensor 82 for detecting the presence of objects within the enclosable compartment 30. Any optical sensor known in the art that can measure changes from one or several light beams may be utilized, such as an infrared (IR) sensor.

The electronic device 72 may be embodied as any portable electronic device 72 having wireless communication such as, but not limited to, smartphones, tablets, key fobs, and the like. Additionally, it is conceivable that the compartment 30 may detect any other item that an occupant may place within the compartment 30 including, but not limited to, a bag 130 (which may hold the electronic device 72), keys, wallets, etc. Any item stored within the compartment 30 may be independently detected and/or communicated with by the compartment 30 and/or a vehicle wireless communication transceiver 114. According to one embodiment, the vehicle wireless communication transceivers 114 may be variously located about the vehicle 12 such that each vehicle wireless communication transceiver 114 has a unique position or alternatively located in close proximity to each other to detect the electronic device 72 position.

The electronic device 72 may include one or more applications 84 stored thereon to enable the electronic device 72 to interface with the compartment wireless communication transceiver 80. In some embodiments, the applications 84 may also enable the electronic device 72 to interface with the controller 76. In one example, the applications 84 may enable the electronic device 72 to wirelessly communicate with the latch 52 and/or latch interface 62 such that the electronic device 72 may be locked within the compartment 30 when the vehicle 12 is unoccupied.

The controller 76 may be a dedicated or shared controller and may include a processor 86 and a memory 88 having instructions thereon that are executable by the processor 86. The instructions may include one or more routines such as an enclosable compartment 30 locking routine 90 and a location sensing routine 92. According to one embodiment, the location sensing routine 92 may utilize the signal strength and time to return of the signals between the compartment wireless communication transceiver 80 and the electronic device 72 to triangulate the cabin location of the electronic device 72.

With continued reference to FIG. 3, the controller 76 may communicate with vehicle equipment 94 to receive information indicating that the departure of the vehicle occupant from the vehicle 12 is imminent. In the depicted embodiment, the vehicle equipment 94 includes a navigation system 96, a body control module (BCM) 98, and a human machine interface (HMI) 100 each of which provides information to the controller 76 that may be used to determine the operation of the enclosable compartment 30. For example, the navigation system 96 may provide the controller 76 with information related to the progress of a trip (e.g., ETA, distance, etc.) and the BCM 98 may provide the controller 76 with information related to the vehicle 12 such as a door status (e.g., locked/unlocked), a seat belt status (e.g., buckled/unbuckled), a vehicle speed, etc.

According to one embodiment, the enclosable compartment locking routine 90 may selectively operate based on the presence of an item within the compartment 30. Additionally, and/or alternatively, the item (e.g. electronic device 72) may include a wireless transceiver attached thereto and/or disposed therein and may communicate with the enclosable compartment wireless transceiver 80. Accordingly, the lid 56 may unlock and/or automatically open as the electronic device 72 having the wireless transceiver approaches the vehicle 12. Moreover, according to one embodiment, if the electronic device 72 is detected to be stored within the compartment 30, the lid 56 may be unlocked and/or automatically open for a predefined amount of time (e.g., 30 seconds) when a predefined vehicle condition occurs, such as, but not limited to, a vehicle engine being placed in an OFF state, a vehicle transmission being placed in park, the BCM 98 detecting an open door condition, etc.

The lid 56 may automatically lock and/or be placed in the closed position when the object detection sensor 82 and/or wireless transceiver 80 detects that the electronic device 72 (or any other desired item) is disposed within the enclosable compartment 30 to retain the electronic device 72 while the vehicle 12 is in motion and/or out of sight of the occupant. For purposes of disclosure, the term "vehicle occupant" should be seen to encompass any vehicle occupant, including a passenger and a driver of the vehicle 12.

With further reference to FIG. 3, the vehicle 12 may additionally include the HMI 100 that may be used for controlling a plurality of functions within the vehicle 12, including, but not limited to, air conditioning settings, seat 14 settings, sound settings, navigational settings. The HMI 100 may also include a display 102 that may display any desired information about the settings and/or any other information about the vehicle 12. The HMI 100 may also include features for the one or more enclosable compartments 30 disposed within the vehicle 12. The HMI 100 may include the latch interface 62 therein and/or may provide an additional latch interface function.

According to one embodiment, each and/or any enclosable compartment 30 within the vehicle 12 may include the latch 52 having a locking/unlocking feature to provide access to the enclosable compartment(s) 30. Accordingly, an occupant can access the compartment 30 by correctly inputting an access code on the HMI 100 and/or a keypad. The code may be a rolling code, as is known in the art. Rolling codes will change whenever used (or at intervals) so that obtaining a single code value has almost no long-term use, or at least very limited use. This prevents potential thieves from returning to the vehicle 12 and using an old code.

Once the vehicle 12 has been initialized by the manufacturer during manufacture, the vehicle 12 may still have further setup to link the vehicle 12 to the electronic device 72. In this illustrative example, the new owner of the vehicle 12 can access the compartment 30, using a fixed entry code (the general entry code) or a physical key, or some other designation that represents that this accessing owner is the permanent owner of the vehicle 12 (as opposed to a temporary user).

The owner information can then be input, using, for example, the HMI 100. If there is not a sufficient HMI 100 in the vehicle 12, an application on a mobile device can be used in conjunction with the initialization process, or a website could be used after initialization was started with the physical key. The owner information is input and various identifying vehicle information is shared between the vehicle 12 and the electronic device 72, for example Vehicle Identification Number (VIN), serial numbers of various modules on the vehicle 12 or other unique identifying characteristics. At this point the vehicle 12 is paired with the electronic device 72.

Figure 4:
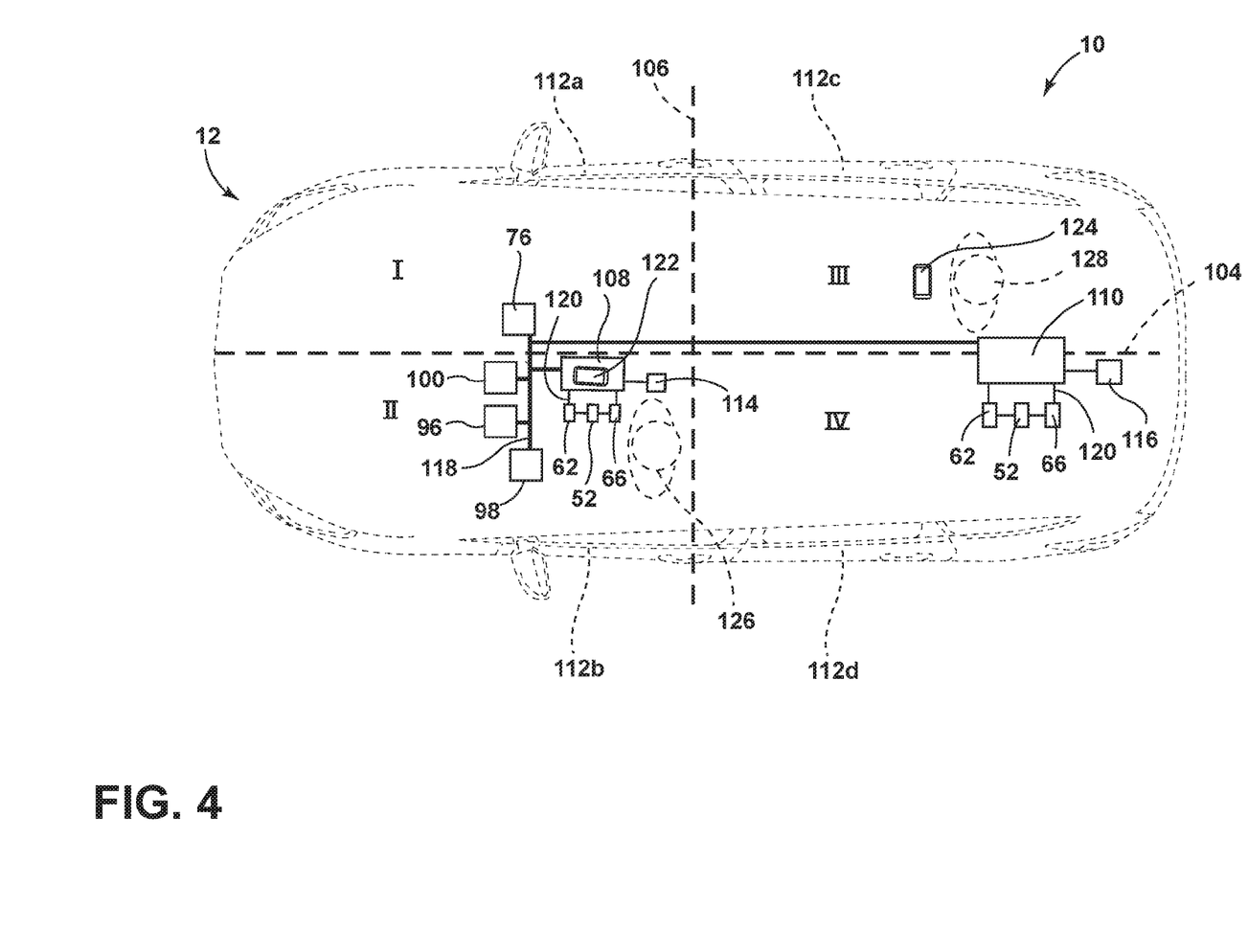
FIG. 4 is a schematic diagram of the lighting system, according to one embodiment.

Referring to FIG. 4, the vehicle 12 is exemplarily shown as having four seating areas I-IV defined by longitudinal axis 104 and lateral axis 106. The vehicle 12 may also include a first and a second enclosable compartment 108, 110. In the depicted embodiment, seating area I corresponds to a front passenger seating area, seating area II corresponds to a driver seating area, seating area III corresponds to a rear passenger-side seating area, and seating area IV corresponds to a rear driver-side seating area. Entry to each seating area I-IV is provided through respective doors 112a-112d. Thus, for purposes of illustration, and not limitation, the vehicle 12 is described herein as a four-door vehicle having two rows of seats. In alternative embodiments, the vehicle 12 may have more or less seating areas (e.g., coupes, vehicles with third row seating, etc.).

As illustrated in FIG. 4, first and second wireless transceivers 114, 116 are operably coupled with each respective compartment 108, 110 within the actuator module 66. As depicted, the controller 76 may be communicatively coupled to the electronic compartments 30, the HMI 100, the navigation system 96, and the BCM 98 over a first vehicle network such as a CAN bus 118. Additionally, each compartment 30 includes the latch 52, latch interface 62, the first and second wireless transceivers 114, 116 and actuator module 66 and may be operably coupled to the enclosable compartments 108, 110 over an additional vehicle network, such as LIN bus 120.

With continued reference to FIG. 4, first and second electronic devices, exemplarily shown as smartphones 122 and 124, respectively, are each located within the vehicle 12 and are each generally in the detection range of the sensing system 74 of each respective compartment 108, 110. In embodiments employing the vehicle wireless communication transceivers 114, the controller 76 may triangulate the cabin location of the smartphones 122, 124 based on the signal strength and time to return of the signals between the vehicle wireless communication transceivers 114 and each of the smartphones 122, 124. Once the respective cabin location of the smartphones 122, 124 is known, the controller 76 may assign each smartphone 122, 124 to the seating area I-IV in which the smartphone 122, 124 is located. For instance, the controller 76 would assign the cabin location of smartphone 122 to seating area II and the cabin location of smartphone 56 to seating area III. As the trip progresses, the controller 76 may continue to monitor the cabin location of the smartphones 122, 124 through sustained communication with the vehicle wireless communication transceivers 114 and reassign the smartphones 122, 124 to other seating areas I-IV should changes to their detected cabin locations dictate that reassignment is necessary. Once a location assignment is established, the compartment 108, 110 within the respective seating area may open and/or unlock as the device approaches that seating area I-IV.

While the detection and subsequent monitoring of the smartphones 122, 124 is underway, the controller 76 may also be supplied information indicating the impending departure from the vehicle 12 of an occupant (e.g., driver 126) carrying smartphone 122 and/or an occupant (e.g., passenger 128) carrying smartphone 124. As described herein, the information may be provided by the compartment wireless communication transceivers 80, the vehicle wireless communication transceivers 114, the navigation system 96, the BCM 98, the smartphones 122, 124, the object detection sensors, and/or a combination thereof. However, it is contemplated that the controller 76 may source information from other vehicle equipment as will be apparent to a skilled artisan. In response to the information, each compartment 108, 110 may lock and/or unlock when the seating area is determined to be unoccupied but the smartphone is within the compartment 108, 110.

In instances where an occupant carrying an electronic device moves between seating areas, the controller 76 may reassign a seating area to the electronic device and operate the compartment 108, 110 associated with the reassigned seating area if information received by the controller 76 indicates the impending departure of the occupant carrying the electronic device. For example, if it is detected that the passenger 128 carrying smartphone 124 moves into seating area IV while a departure event is underway, the controller 76 may activate the compartment 108, 110 associated with seating area IV according to the any of the implementations described herein.

Figure 5:
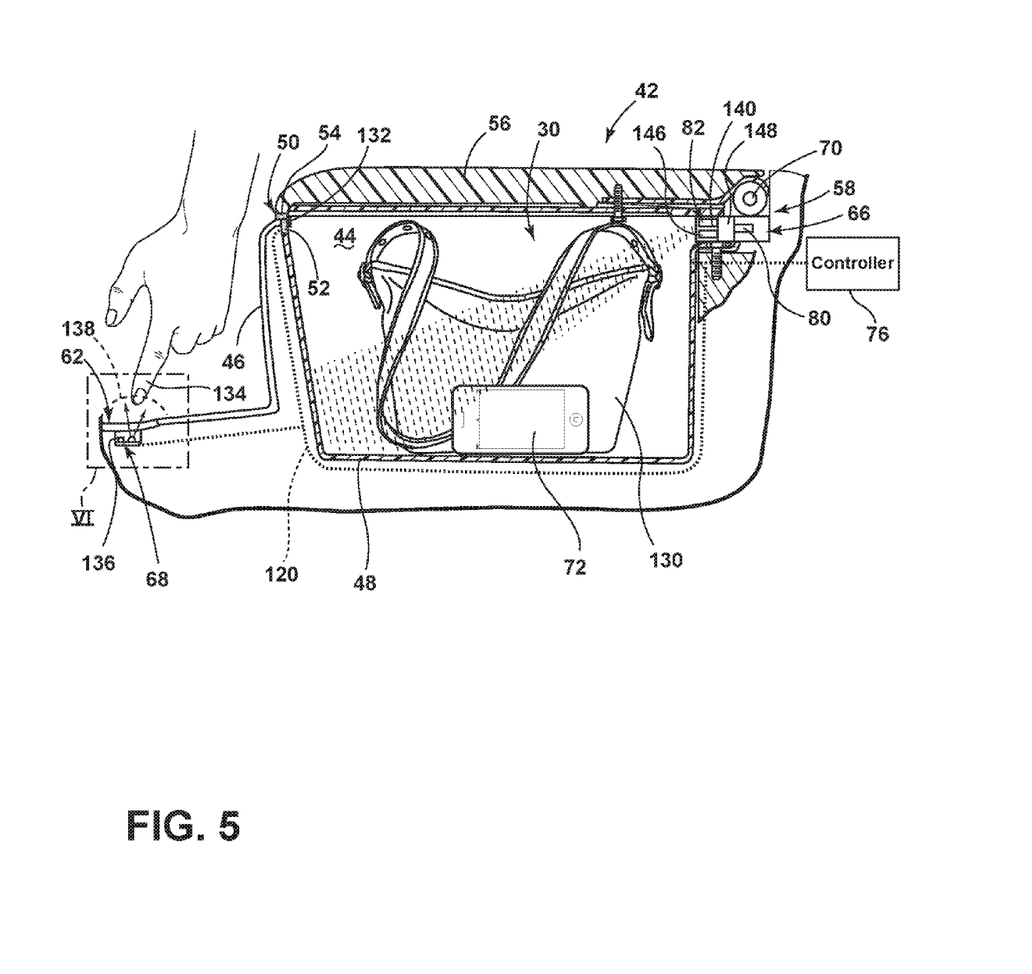
FIG. 5 is a cross section of a center console taken along the line V-V of FIG. 2, according to one embodiment.

With reference to FIG. 5, the enclosable compartment 30 includes the latch 52 for maintaining the lid 56 in the closed position and for unlocking the lid 56 to allow the lid 56 to move to the open position. The latch 52 includes an actuable member 132 such as an electromagnetic actuated latch 52 that changes the position of the member such that the lid 56 may be placed in the locked and unlocked states in response to a control signal. Alternatively, the latch 52 may be any other type of mechanical and/or electrical latch known in the art.

The latch interface 62 may employ a proximity switch 68 to allow an operator to actuate the latch 52. The proximity switch 68 is configured to detect an object such as an operator's hand 134 in close proximity thereto. Control circuitry activates the latch 52 via a control signal to open, close, lock, unlock, latch, and/or unlatch the lid 56 based on an object sensed by the proximity switch 68.

The proximity switch 68 is shown and described in reference to FIG. 5 as a capacitive sensor 136. The capacitive sensor 136 provides a sense activation field 138 to sense contact or close proximity (e.g., within one millimeter) of an object, such as the hand 134 (e.g., palm or finger(s)) of an operator in relation to the proximity switch 68. The proximity switch 68 may also detect a swiping motion by the hand 134 of the operator such as a swipe of the thumb or other finger. Thus, the sense activation field 138 of each proximity switch 68 is a capacitive field in the exemplary embodiment and the user's hand 134 including the palm, thumb and other fingers have electrical conductivity and dielectric properties that cause a change or disturbance in the sense activation field 138 as should be evident to those skilled in the art. However, it will be appreciated by those skilled in the art that additional or alternative types of proximity switches can be used, such as, but not limited to, inductive sensors, optical sensors, temperature sensors, resistive sensors, the like, or a combination thereof. Exemplary proximity switches are described in the Apr. 9, 2009, ATMEL® Touch Sensors Design Guide, 10620 D-AT42-04/09, the entire reference hereby being incorporated herein by reference.

When the open control output is determined by the proximity switch 68 and the controller 76, the lid 56 may be placed in the open position by an occupant of the vehicle 12, or automatically opened by an actuator within the actuator module 66. The actuator module 66 may also include the object detection sensor, which may be in the form of an infrared (IR) transmitter 140 and an IR receiver 142. The IR transmitter 140 is aimed to emit an IR signal 144 toward a target location. The IR receiver 142 is positioned to receive and detect the IR signal 144 reflected by an item within the compartment 30. For purposes of illustration, the reflected IR signal is generally represented by arrow 146. The item may be the electronic device described herein, an item in which the electronic device is disposed therein, such as a bag 130 or purse, or any other item that may be desired to place within the compartment 30.

As shown in FIG. 5, the IR transmitter 140 and receiver 142 may be electrically coupled to a printed circuit board (PCB) 148 therein. The compartment wireless transceiver 80 may also be disposed on the PCB 148. Accordingly, the IR transmitter 140, the IR receiver 142, and the compartment wireless transceiver 80 may be powered by a vehicle power supply or an alternative source, if so desired. In operation, the IR receiver 142 may detect (e.g., decode) the IR signal 144 through conventional means to assess signal strength, signal rise, signal range, signal stability, and any other signal characteristics that aid in uniquely identifying the IR signal 144.

In the presently depicted embodiment, the lighting system 10 may include the controller 76 communicatively coupled to the IR transmitter and receiver 140, 142 and configured to control the operation of the same. The controller 76 may be variously configured to include one or more programmable logic devices, application specific integrated circuits, digital signal processors, and/or microcontrollers for effectuating control of the IR transmitter and receiver 140, 142, along with other componentry of the compartment 30.

Figure 6:
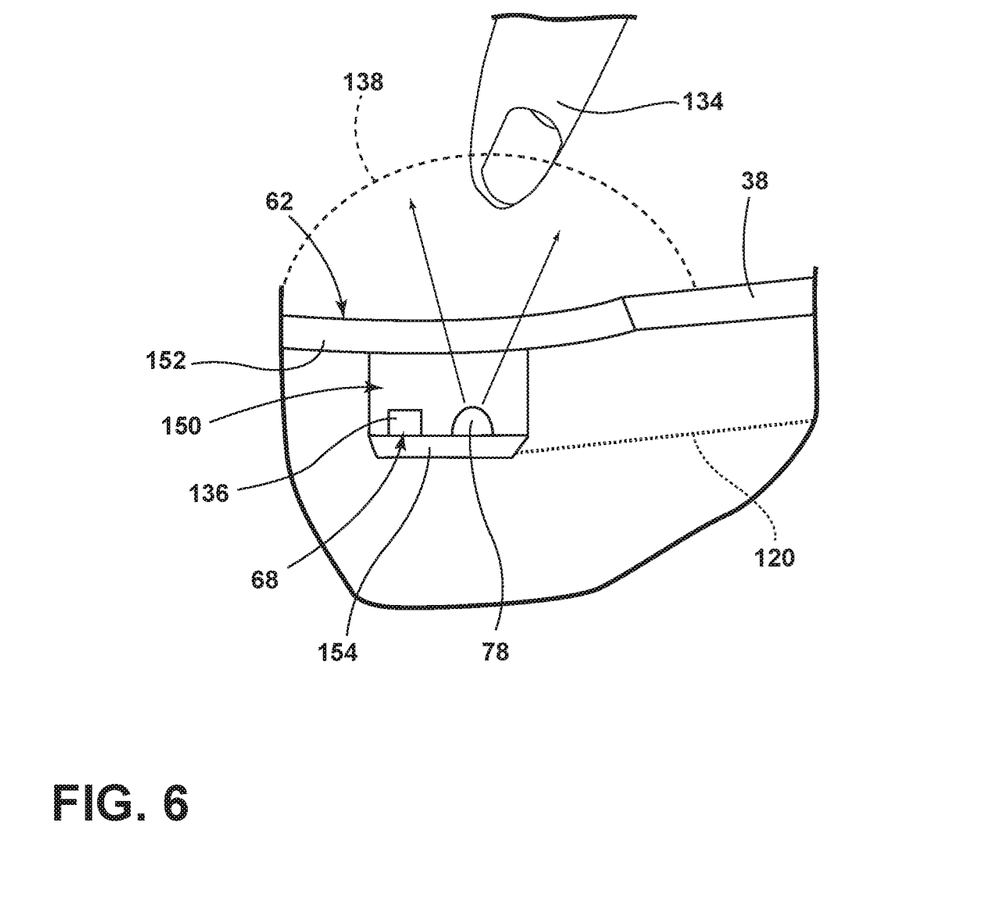
FIG. 6 is an enhanced view of the compartment outlined by area VI of FIG. 5, according to one embodiment.

Referring to FIG. 6, the proximity switch 68 and/or the light source 78 may be disposed within a cavity 150 defined by the housing 38. A light transmissive lens 152 may be disposed above the proximity switch 68 and/or the light source 78. The proximity switch 68 and the light source 78 may be disposed on a common PCB 154 that is electrically coupled with the controller 76, as provided herein.

The light source 78 may be configured as a multicolored light source that illuminates in a plurality of colors, such as an RGB LED having separate red, green and blue LED chips therein. Accordingly, the light source 78 may be configured as a status identifier for the compartment 30. In other words, the light source 78 may indicate the status of the compartment 30 (e.g., whether the compartment 30 is empty or occupied) and may flash at a higher intensity when the vehicle 12 determines an occupant is leaving the vehicle 12 with an item in the compartment 30. For example, the light source 78 may flash at 1-5 times steady state current to notify the occupant of the forgotten item.

Additionally, the light source 78 may be configured to illuminate in a first color (e.g., red) to indicate that the compartment 30 is occupied. The light source 78 may illuminate in a second color (e.g., green) when the compartment 30 is unoccupied. If the lid 56 is placed in the open position, the light source 78 may illuminate in a third color (e.g., amber) to remind an occupant to remove the item disposed within the compartment 30 prior to exiting the vehicle 12.

Figure 7:
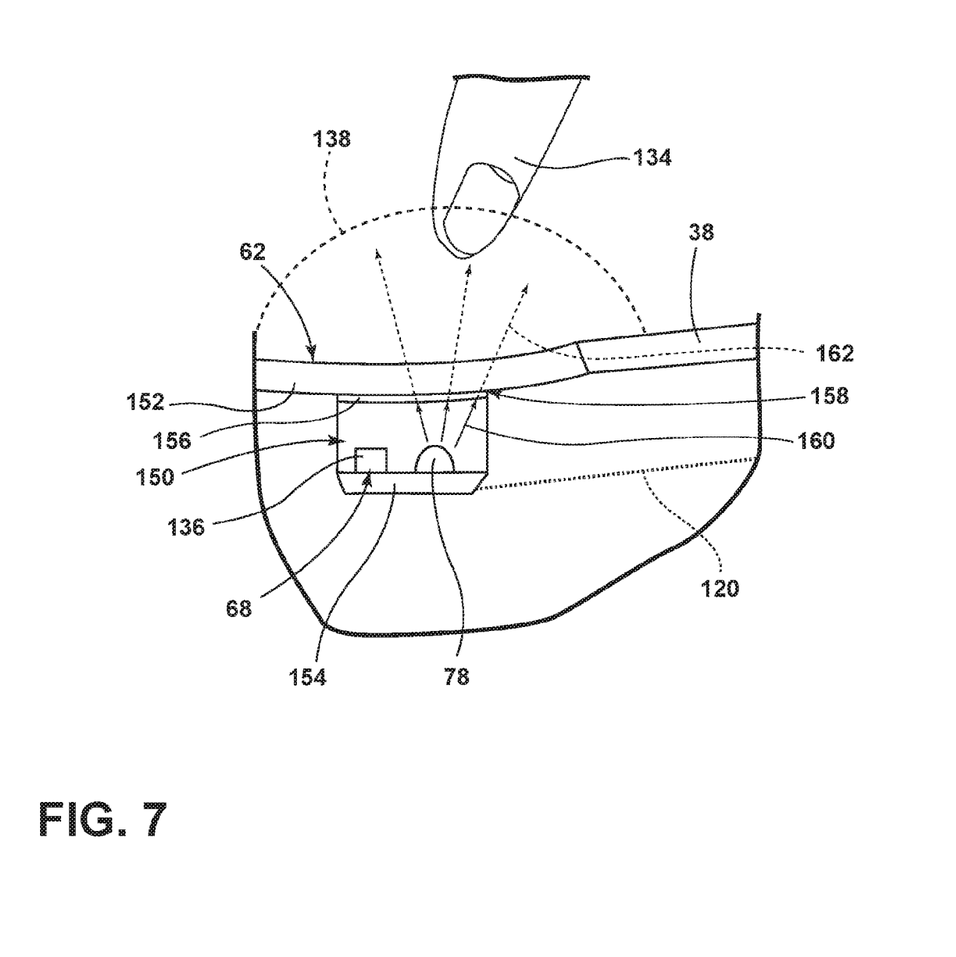
FIG. 7 is an enhanced view of the compartment outlined by area VI of FIG. 5, according to an alternate embodiment.

Referring to FIG. 7, a photoluminescent structure 156 is coupled to a bottom surface 158 of the lens 152 and may include one or more photoluminescent materials configured to luminesce in response to excitation light 160 emitted by the light source 78. The photoluminescent structure 156 may be applied to the bottom surface 158, or any other desired surface of the housing 38, through pad printing, painting, flexography, or other known processes. Alternatively, the photoluminescent structure 156 may be integrated with the lens 152 and/or the housing 38 through a molding process. While the photoluminescent structure 156 is shown coupled to the bottom surface 158 of the housing 38, it should be appreciated that additional photoluminescent structures may be coupled to other portions of the housing 38 and/or the compartment 30, if desired.

At the most basic level, the photoluminescent structure 156 includes an energy conversion layer having one or more photoluminescent materials therein. The photoluminescent material has energy converting elements with phosphorescent or fluorescent properties. Each photoluminescent material may become excited upon receiving the excitation light 160 of a specific wavelength from the light source 78, thereby causing the light to undergo a conversion process. Under the principle of down conversion, the excitation light 160 is converted into a longer wavelength, converted light 162 that is outputted from the photoluminescent structure 156. Conversely, under the principle of up conversion, the excitation light 160 is converted into a shorter wavelength light that is outputted from the photoluminescent structure 156. When multiple distinct wavelengths of light are outputted from the photoluminescent structure 156 at the same time, the wavelengths of light may mix together and be expressed as a multicolor light. With respect to either conversion principle, the difference in wavelength between the excitation light 160 and the converted light 162 is known as the Stokes shift and serves as the principle driving mechanism for an energy conversion process corresponding to a change in wavelength of light. In the various embodiments discussed herein, each of the photoluminescent structures 156 may operate under either conversion principle.

With further reference to FIG. 7, in embodiments that include the photoluminescent structure 156, the photoluminescent structure 156 may exhibit a constant unicolor or multicolor illumination. For example, the controller 76 may prompt the light source 78 to emit only a first wavelength of excitation light 160 to cause the photoluminescent structure 156 to luminesce in the first color (e.g., red). Alternatively, the controller 76 may prompt the light source 78 to emit only a second wavelength of excitation light 160 to cause the photoluminescent structure 156 to luminesce in the second color (e.g., yellow). Alternatively still, the controller 76 may prompt the light source 78 to simultaneously emit the first and second wavelengths of excitation light 160 to cause the photoluminescent structures 156 to luminesce in a third color (e.g., amber) defined by an additive light mixture of the first and second colors. Moreover, additional photoluminescent structures 156 may be added to the compartment 30 that convert the excitation light 160 emitted from the light source 78 to a different wavelength. Alternatively still, the controller 76 may prompt the light source 78 to alternate between periodically emitting the first and second wavelengths of excitation light 160 to cause the photoluminescent structure 156 to periodically luminesce by alternating between the first and second colors of converted light 162. The controller 76 may prompt the light source 78 to periodically emit the first and/or second wavelengths of excitation light 160 at a regular time interval and/or an irregular time interval.

With respect to the above examples, the controller 76 may modify the intensity of the emitted first and second wavelengths of excitation light 160 by pulse-width modulation or current control. In some embodiments, the controller 76 may be configured to adjust a color of the converted light 162 by sending control signals to adjust an intensity or energy output level of the light source 78. For example, if the light source 78 is configured to output the excitation light 160 at a low level, substantially all of the excitation light 160 may be converted to the outputted, visible converted light 162. If the light source 78 is configured to emit excitation light 160 at a high level, only a portion of the excitation light 160 may be converted to the converted light 162 by the photoluminescent structure 156. In this configuration, a color of light corresponding to mixture of the excitation light 160 and the converted light 162 may be output as the outputted light.

Though a low level and a high level of intensity are discussed in reference to the excitation light 160, it shall be understood that the intensity of the excitation light 160 may be varied among a variety of intensity levels to adjust a hue of the color corresponding to the emitted excitation and/or converted light 160, 162. As described herein, the color of the converted light 162 may be significantly dependent on the particular photoluminescent material utilized in the photoluminescent structure 156. Additionally, a conversion capacity of the photoluminescent structure 156 may be significantly dependent on a concentration of the photoluminescent structures 156 utilized in the photoluminescent structure 156. By adjusting the range of intensities that may be emitted from the light source 78, the concentration and proportions of the photoluminescent materials in the photoluminescent structure 156 and the types of photoluminescent materials utilized in the photoluminescent structure 156 discussed herein may be operable to generate a range of color hues of outputted light by blending the excitation light 160 with the converted light 162. It is also contemplated that the intensity of the light source 78 may be varied simultaneously, or independently, from any number of other light sources.

Additional information regarding the construction of photoluminescent structures 156 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

Figure 8:
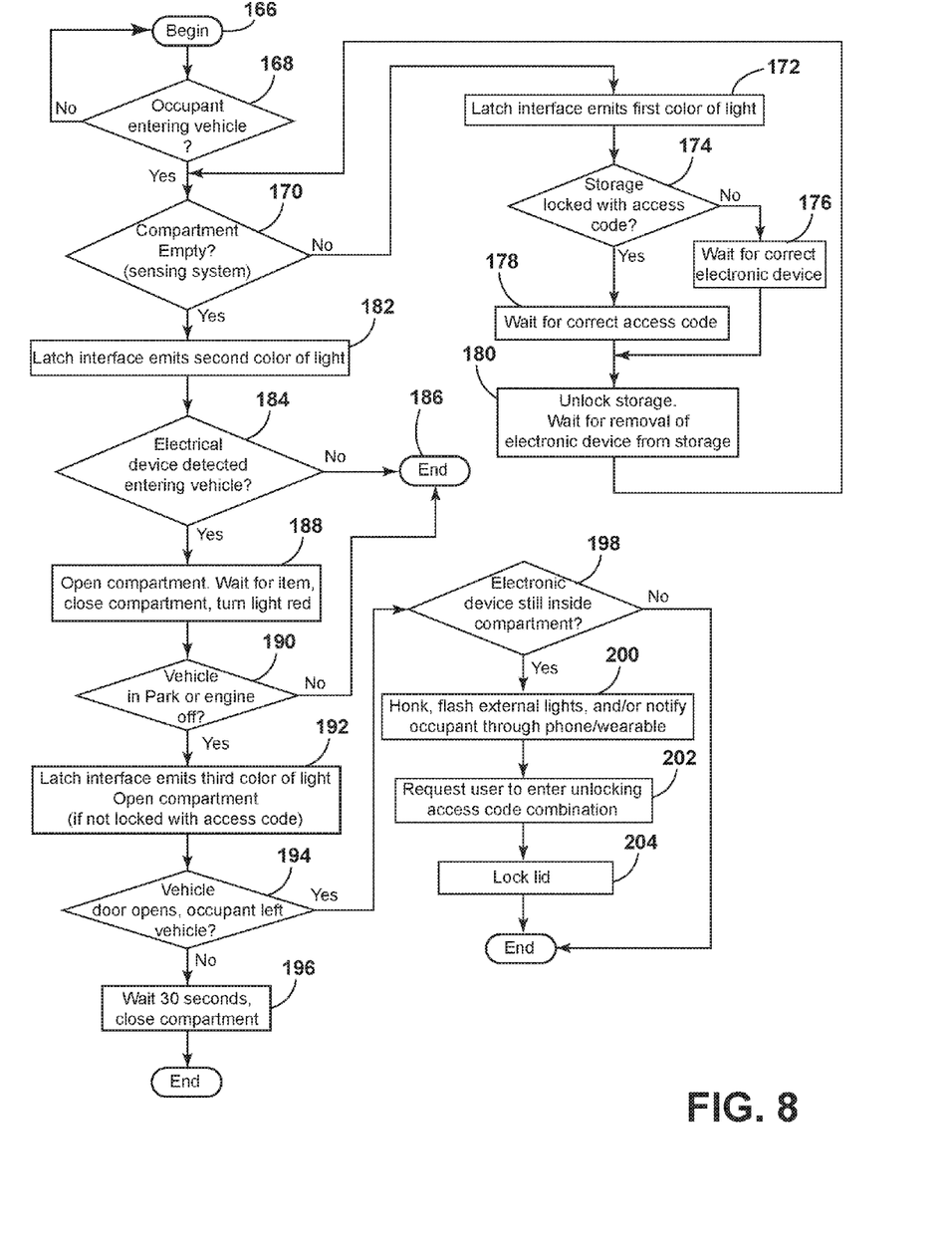
FIG. 8 is a flow diagram illustrating one implementation of the compartment.

Referring to FIG. 8, a method of employing the enclosable compartment 30 disclosed herein is represented. At step 166, the process begins. At step 168, one or more transceivers 80, 114 including the compartment wireless communication transceiver 80 and the vehicle wireless communication transceivers 114, as provided herein, monitor to determine if a known occupant is approaching the vehicle 12. If it is determined that a known occupant is approaching the vehicle 12, the process proceeds to step 170, where the sensing system 74 determines if any items are stored within the compartment 30.

If the sensing system 74 determines that the compartment 30 is occupied by one or more item, at step 172, the latch 52, through the light source 78 and/or the photoluminescent structure 156, may emit a first color of light (e.g., red light) to notify the approaching occupant of the status of the compartment 30. Next, at step 174, it is determined whether the occupied compartment 30 is placed in a locked state and an access code is necessary for unlocking the compartment 30. If an access code is not needed, at step 176, the compartment 30 is waits for a known electronic device to approach the compartment 30. If an access code is needed, at step 178, the enclosable compartment 30 waits for the correct access code to be entered. Once the correct access code is inputted, or the known electronic device approaches the compartment 30, at step 180, the compartment 30 is unlocked and/or autonomously opened.

If at step 170 it is determined that the compartment 30 is empty, the latch interface 62 may emit a second color of light (e.g., green). At step 184, the compartment 30 determines if a known electronic device is entering the vehicle 12. If a known electronic device does not enter the vehicle 12, the method may end at step 186. If a known electronic device does enter the vehicle 12, the compartment 30 may autonomously open and wait for the item to be disposed within the compartment 30 at step 188. Once the item is disposed within the compartment 30, the compartment 30 may be closed manually and/or autonomously and the first color of light may be emitted from the light source 78 and/or photoluminescent structure 156.

At step 190, the compartment 30 may remain in a constant state until the vehicle 12 transmission is placed in a park condition, or the vehicle engine is placed in an OFF condition or any other predefined vehicle condition occurs. If the vehicle 12 is placed in park or the engine is placed in the OFF condition, at step 192, the compartment 30 may be opened and the latch interface 62 may emit a third color of light (e.g., amber) to remind the exiting occupant of the item disposed within the compartment 30.

At step 194, the vehicle 12 determines if any door 112a-112d has been opened. If the vehicle door 112a-112d is not opened after the vehicle 12 is placed in park or the vehicle engine is placed in the OFF condition, the lid 56 may maintain an open position for a predetermined amount of time (e.g., 30 seconds) and then reclose at step 196. Alternatively, if the vehicle door 112a-112d is opened, at step 198, the compartment 30 determines if the electronic device is still disposed within the compartment 30. If the electronic device is still disposed within the compartment 30, at step 200, the vehicle 12 may activate a vehicle horn, flash external lights, and/or notify the exited occupant of the left electronic device through a notification on an occupant's alternative electronic device and/or a wearable electronic device. The compartment 30 may also request that the proper access code be entered prior to unlocking of the lid 56 at step 202. If the proper access code is not entered, or the vehicle 12 is left unattended for a predetermined amount of time, at step 204, the lid 56 is placed in a locked position such that the enclosable compartment 30 is inaccessible. The process then ends at step 206.

A variety of advantages may be derived from the use of the present disclosure. For example, the enclosable compartment may provide autonomous access thereto. Further, the enclosable compartment may store items therein such that the items may be prevented from moving about the vehicle when the vehicle is in motion and/or involved in a collision. Finally, lockable features of the enclosable compartment may assist in preventing theft of items that are left in an unoccupied vehicle.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A compartment for a vehicle, comprising:
    a housing defining an interior volume;
    a lid pivotably coupled to the housing and configured to move between a closed position in which the interior volume is inaccessible and an open position in which the interior volume is accessible;
    a latch configured to maintain the lid in a locked and an unlocked state when the lid is disposed in the closed position; and
    a compartment sensing system operably coupled with a controller and including a wireless transceiver, wherein the latch is placed in the locked state when the wireless transceiver detects the presence of an electronic device.

2. The compartment for a vehicle of claim 1, wherein the housing is configured as a center console that is disposed between two laterally spaced seats within the vehicle.

3. The compartment for a vehicle of claim 1, wherein the lid is pivotably coupled to the housing through an actuator module that is operably coupled to the latch.

4. The compartment for a vehicle of claim 1, wherein an actuator module includes the sensing system therein.

5. The compartment for a vehicle of claim 4, wherein the sensing system includes an object detection sensor.

6. The compartment for a vehicle of claim 1, wherein the lid is pivotably coupled to the housing through a hinge.

7. A compartment for a vehicle, comprising:
    a housing defining an interior volume;
    a lid pivotably coupled to the housing;
    a latch configured to maintain the lid in a locked and an unlocked state;
    a controller operably coupled with the latch; and
    a compartment sensing system operably coupled with the controller and including a wireless transceiver, wherein the latch is placed in the locked state when the wireless transceiver detects the presence of an electronic device.

8. The compartment for a vehicle of claim 7, wherein the latch includes a latch interface that is configured to allow an occupant of the vehicle to actuate the latch between the locked and unlocked states.

9. The compartment for a vehicle of claim 8, wherein the latch interface includes a switch for actuating the latch.

10. The compartment for a vehicle of claim 9, wherein the switch is configured as a capacitive sensor.

11. The compartment for a vehicle of claim 8, wherein the latch interface includes a light source that is configured to notify an occupant of the vehicle of the state of the latch.

12. The compartment for a vehicle of claim 7, wherein the sensing system further includes an infrared (IR) sensor for detecting an item within the interior volume.

13. The compartment for a vehicle of claim 8, wherein the latch interface is disposed within a HMI disposed within the vehicle.

14. A compartment for a vehicle, comprising:
    a housing defining an interior volume;
    a lid pivotably coupled to the housing;
    a latch configured to maintain the lid in a locked and an unlocked state;
    a latch interface operably coupled with the latch and including a photoluminescent structure; and
    a compartment sensing system operably coupled with the latch, wherein the latch is actuated based the presence of an item within the interior volume and a vehicle condition.

15. The compartment for a vehicle of claim 14, wherein the vehicle condition is defined as a current state of a vehicle transmission.

16. The compartment for a vehicle of claim 14, wherein the vehicle condition is defined as a current state of a vehicle engine.

17. The compartment for a vehicle of claim 14, wherein the latch interface includes a light source that is configured to notify an occupant of the vehicle of the state of the latch.

18. The compartment for a vehicle of claim 17, wherein the light source is configured as an RGB LED.

19. The compartment for a vehicle of claim 17, wherein the light source emits light towards the photoluminescent structure causing the photoluminescent structure to luminesce.

* * * * *